United States Patent [19]
Yanagawa et al.

[11] Patent Number: 4,894,730
[45] Date of Patent: Jan. 16, 1990

[54] MANUALLY SWEEPING CONTACT SENSITIVE COPIER WITH IMAGE DATA MEMORY

[75] Inventors: Nikio Yanagawa; Kenji Honda; Hiroshi Okumura, all of Tokyo, Japan

[73] Assignee: Casio Computer Co., Ltd., Tokyo, Japan

[21] Appl. No.: 197,989

[22] Filed: May 24, 1988

[30] Foreign Application Priority Data

May 26, 1987 [JP] Japan ................. 62-128822
Apr. 27, 1988 [JP] Japan ............. 63-56895[U]

[51] Int. Cl.4 .................................... H04N 1/04
[52] U.S. Cl. ......................... 358/473; 382/59
[58] Field of Search ............. 358/294, 280, 285, 293, 358/286, 473; 382/59

[56] References Cited

U.S. PATENT DOCUMENTS 3,767,020 10/1973 Rowe .
3,973,111 8/1976 Washizuka ............... 235/156
4,523,235 6/1985 Rajchman .
4,611,246 9/1986 Nihei ....................... 358/256
4,626,925 12/1986 Toyoda .................... 358/285
4,639,790 1/1987 Kusaka ..................... 358/294
4,652,937 3/1987 Shimura ................... 358/286
4,701,804 10/1987 Toyoda .................... 358/280
4,731,668 3/1988 Satomura ................. 358/293
4,742,559 5/1988 Fujiwara .................. 382/59
4,772,954 9/1988 Shin ........................ 358/293

FOREIGN PATENT DOCUMENTS 61-94450 5/1986 Japan .
61-28175 12/1986 Japan .
62-97466 5/1987 Japan .
0245768 10/1987 Japan .
0042273 2/1988 Japan .
0086665 4/1988 Japan .
0158962 7/1988 Japan .

Primary Examiner—Edward L. Coles, Sr.
Assistant Examiner—Jerome Grant
Attorney, Agent, or Firm—Frishauf, Holtz, Goodman & Woodward

[57] ABSTRACT

A hand-held copier reads image data from an original while it is being swept across the original, and prints the image data on a sheet of printing paper while it is being swept across the printing paper. The copier has a memory for storing the image data read from the original. It has a start switch and a touch-detecting switch. The touch-detecting switch detects whether or not the copier appropriately contacts the original or the printing paper. The data-reading operation and the data-printing operation are controlled in accordance with whether these switches are turned on or off.

13 Claims, 9 Drawing Sheets

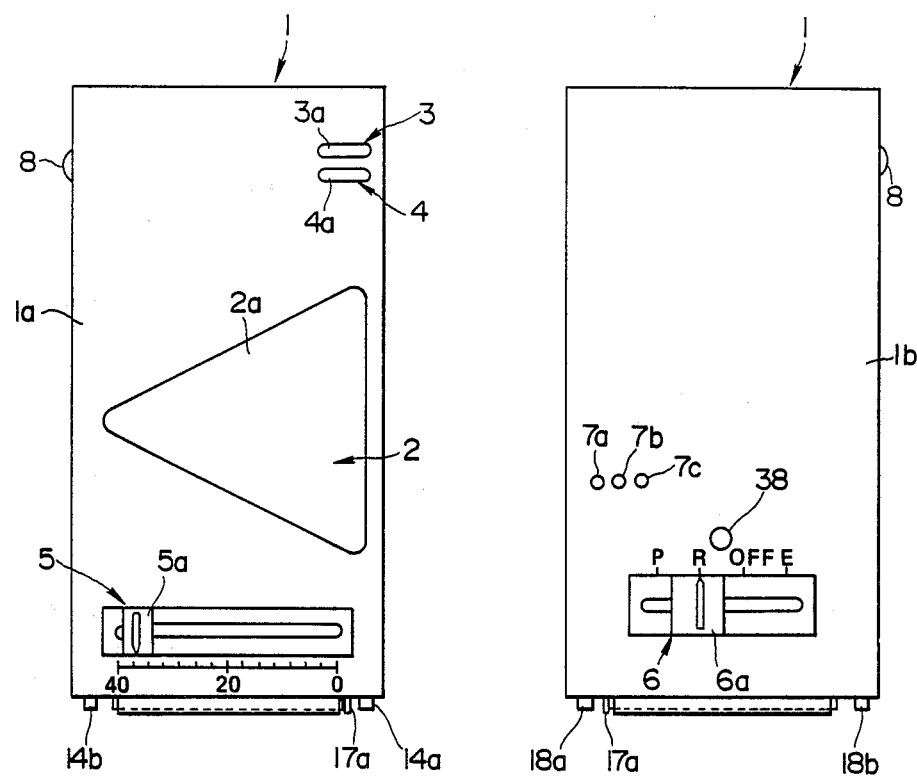

MANUALLY SWEEPING CONTACT SENSITIVE COPIER WITH IMAGE DATA MEMORY

BACKGROUND OF THE INVENTION

1. Field of the Invention

The present invention relates to a manually sweeping copier apparatus for processing image data, while being manually swept across mediums, and more particularly, to a manually sweeping copier apparatus for reading image data from an original such as a document, photograph, printed matter, while being swept across the original, and/or for printing image data on a printing medium, while being swept across the printing medium.

2. Description of the Related Art

Various manually sweeping apparatuses copiers are known. One of them is disclosed in U.S. Pat. No. 3,767,020, issued to Power on Oct. 23, 1973, entitled "Manually Positionable Automatic Printer." This printer comprises a hand-held housing and other components located within the housing, such as a print head, a roll of ink ribbon and an encoder. When the housing is put on a sheet of printing paper, the ink ribbon contacts the printing paper. As the housing is manually moved across the paper, the print head is automatically driven, thereby printing data on the printing paper.

Another of the manually sweeping apparatuses copiers is disclosed in U.S. Pat. No. 4,523,235, issued to Rajchman on Jun. 11, 1985, entitled "Electronic Microcopier Apparatus." The microcopier apparatus comprises a hand-held housing and other components incorporated within the housing, such as a print head, an image sensor, a memory and an encoder. When the housing is manually swept across an original, the image sensor reads the data from the original, and the data is stored into the memory. When the housing is manually moved across a sheet of printing paper, while being kept in contact therewith, the data is read from the memory and subsequently printed on the printing paper.

Since such manually sweeping apparatuses copiers are swept by hand across an original and a sheet of printing paper, the probability is high that the housing fails to contact the original or the paper completely. When the housing is swept across the original, without completely contacting the original, the apparatus cannot read the data correctly from the original. When the housing is moved across the printing paper, without completely contacting the paper, the data cannot be correctly printed on the paper.

SUMMARY OF THE INVENTION

It is accordingly the object of the present invention to provide a manually sweeping copier apparatus which does not start reading data from an original or printing data on a sheet of printing paper, unless the operator holds the apparatus in complete contact with the original or the printing paper, whereby any error in the data-reading and data-printing is reduced.

To achieve this object, a hand-held manually sweepable copier apparatus according to the present invention includes a housing which is manually sweepable across an original which has image data thereon, or a printing medium; image-data processor attached to said housing means for reading the image data from the original while said housing is being manually swept across the recording medium, and/or for printing the data on the printing medium while the housing is being manually swept across the printing medium; touch-detector attached to the housing for detecting whether the housing touches either the original or the printing medium and generating a detection signal when the housing means touches the original or the printing medium; manual switch provided to the housing for generating an ON-signal when turned on, and an OFF-signal when turned off; and controller attached to the housing for causing the image-data processor to start operating, in response to both the ON-signal output by the manual switching means, and the detection signal output by the touch-detector.

Thus, the manually sweeping copier apparatus does not start reading data from the original or printing data on the printing medium, unless the operator holds the apparatus in complete contact with the original or the printing paper. Therefore, any error is the data-reading and data-printing is reduced.

BRIEF DESCRIPTION OF THE DRAWINGS

FIG. 1 is a front view of a manually sweeping copier according to one embodiment of the present invention;

FIG. 2 is a back view of the copier shown in FIG. 1;

DETAILED DESCRIPTION OF THE PREFERRED EMBODIMENTS

Figure 3:
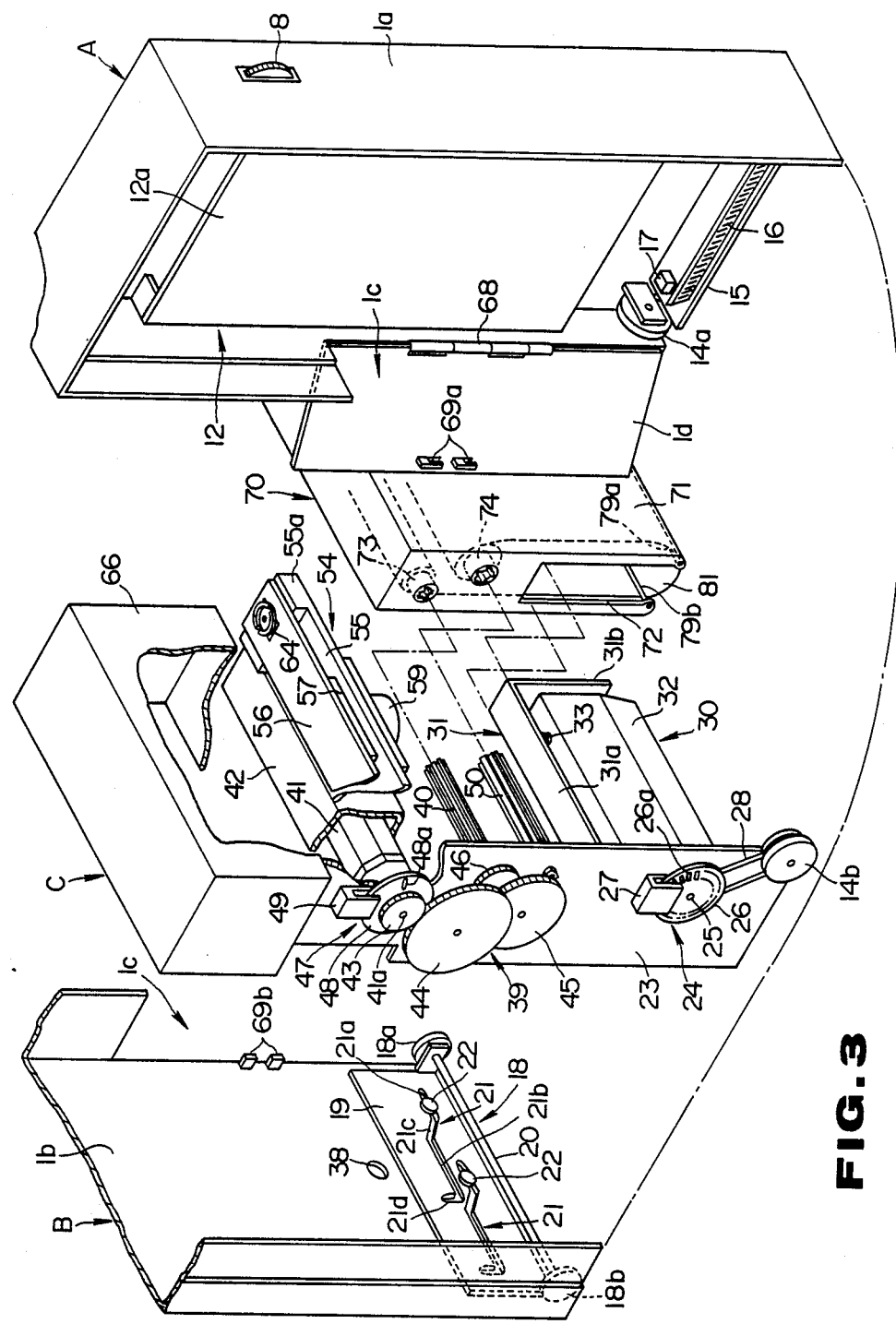
FIG. 3 is an exploded view of the copier illustrated in FIGS. 1 and 2.

Embodiments of the present invention will now be described, with reference to the drawings attached hereto.

First Embodiment

FIGS. 1 and 2 are a front view and a back view of a manually sweeping copier, i.e., a first embodiment of the present invention. The manually sweeping copier comprises housing 1 which is a rectangular box and is small enough to be held by hand. As is shown in FIG. 1, start switch 2 is mounted on the center part of the front surface of housing 1. Enlarge-print key 3 and reset/clear key 4 are provided on the upper-right part of the front surface. Further, reading-width switch 5 is arranged on the lower part of the front surface. As is illustrated n FIG. 2, mode-selecting switch 6, power-on indicating LED (light-emitting diode) 7a, memory alarm LED 7b, and speed alarm LED 7c are provided on the back of housing 1. As shown in both FIG. 1 and FIG. 2, a print-density dial 8 is mounted on one side of housing I.

When enlarge-print key 3 is turned on, image data can be printed on a sheet of printing paper in a size greater than a size of original. When reset/clear key 4 is depressed after image data has been printed, the same data can be printed. Further, when reset/clear key 4 is depressed after image data has been read, the read data in a memory (later described) is cleared. Mode-selecting switch 6 functions as a power-supply switch as well, and can set the copier to various operation modes when it is appropriately operated as will be described later. Power-on indicating LED 7a emits light as long as the copier is supplied with electric power, when mode-selecting switch 6 is turned on. Memory alarm LED 7b is automatically turned on when the vacancy of the memory incorporated within housing 1 decreases below a predetermined value. Speed alarm LED 7c is automatically turned on when housing 1 is moved at a speed higher than a reference value. Reading-width switch 5 is designed to set a width over which image data will be read from an original. Print-density dial 8 is used to set a desired density in which image data will be printed on recording paper.

As is illustrated in FIG. 3, the manually sweeping copier comprises a front case block, a read case block B, and a chassis block C. Case blocks A and C constitute housing 1, and chassis block C is located within housing 1.

As is shown in FIGS. 1 and 2, front case block A comprises front case 1a, start switch 2, enlarge-print key 3, reset/clear key 4, reading-width switch 5, and print-density dial 8. Switches 2 and 5, and keys 3 and 4 are arranged on the outer surface of front case 1a. Print-density dial 8 is attached to one side of front case 1a. Start switch 2 is turned on when large button 2a, which is mounted on the outer surface of case 1a is depressed. Enlarge-print key 3 is turned on when button 3a, inserted in a hole cut in case 1a, is pushed in. Similarly, reset/clear key 4 is turned on when button 4a, also inserted in a hole made in case 1a, is depressed. Reading-width switch 5 is a slide switch and has a sliding member 5a which can slide on the outer surface of case 1a.

As is shown in FIG. 3, control unit 12 is fastened to the inner surface of front case 1a. Control unit 12 comprises circuit board 12a and a plurality of LSI chips (not shown) mounted on circuit board 12a. Switches and 5, and keys 3 and 4 are connected to control unit 12. A print-density control circuit (not shown), which includes print-density dial 8, is amounted on circuit board 12a. Dial 8 protrudes from one side of front case 1a. First paper-contacting roller 14a is rotatably mounted on a shaft projecting horizontally and inwardly from that side of case 1a which opposes the side on which dial 8 is provided. This roller 14a slightly protrudes from the lower end of front case 1a. Horizontal plate 15 extends from the inner surface of front case 1a. LED array 16 for illuminating an original is mounted on horizontal plate 15. Touch-detecting switch 17 is also mounted on plate 15. Touch-detecting switch 17 is designed to detect whether or not the housing completely contacts an original or a sheet of printing paper. Switch 17 comprises a micro switch having an operation pin. This pin is biased downward by a spring such that it protrudes from the lower end of front case 1a. Hence, when housing 1 comes into contact with the original or the printing paper, the operation pin abuts on the original or the paper, and subsequently moves upward. Switch 17 is turned on when the operation pin moves upward.

As is illustrated in FIGS. 2 and 3, rear case block B comprises rear case 1b, mode-selecting switch 6, power-on indicating LED 7a, memory alarm LED 7b and speed alarm LED 7c. Mode-selecting switch 6 is a slide switch and has sliding member 6a which can slide on the outer surface of rear case 1b. Sliding member 6a can take four positions, i.e., a P-position (print-mode position), an R-position (read-mode position), an OFF-position (power-off position), and an E-position (cassette-eject position). When member 6a is at the OFF-position, mode-selecting switch 6 disconnects a power supply from any component of the copier, that require electric power to perform its function. When member 6a is moved to the P-position or the R-position, switch 6 connects the power supply to components which require electric power, and sets the copier to the print mode or the read mode. Mode-selecting switch 6 is connected by lead lines (not shown) to control unit 12 fastened to front case block A.

Auxiliary roller unit 18 is secured to the lower part of the inner surface of rear case 1b. This unit 18 comprises movable plate 19 which can vertically slide on the inner surface of rear case 1b, horizontal shaft 20 which is rotatably supported at both end portions on movable plate 19, and auxiliary paper-contacting rollers 18a and 18b which are fastened to the ends of shaft 20, respectively. Auxiliary roller unit 18 is moved up or down when the sliding member 6a of mode-selecting switch 6 is moved to the left or the right (FIG. 2). Plate 19 has two cam slits 21. Each of cam slits 21 consists of lower horizontal section 21a, upper horizontal section 21b slanted section 21c connecting horizontal sections 21a, and vertical section 21d extending from that end of upper horizontal section 21b which is opposite to the end connected slanted section 21c. Two cam pins 22, both fixed to sliding member 6a, extend through cam slits 21, respectively. Hence, when member 6a is moved to the left or the right, cam pins 22 move in cam slits 21. More specifically, when member 6a is at the P-position, thus setting the copier in the print mode, cam pins 22 are located in lower horizontal section 21a of cam slits 21. When member 6a is moved to the R-position, thereby setting the copier in the read mode, cam pins 22 move to the starting ends of upper horizontal sections 21c, after passing through slanted sections 21c. As pins 22 pass through slanted sections 21c, they push movable plate 19 downwardly. When sliding member 6a is moved from the R-position to the OFF-position, thus disconnecting the power supply to the electrically operated components, cam pins 22 move to the middle portions of upper horizontal sections 21c. When member 6a is further moved to the E-position (i.e., the cassette-eject position), cam pins 22 move into vertical sections 21d. Hence, auxiliary roller unit 18 is moved up when mode-selecting switch 6 is operated to select the print mode, and is moved down when switch 6 is operated to select the read mode. When the copier is set to the print mode, both auxiliary paper-contacting rollers 18a and 18b are located such that their lowest portions are at substantially the same level as the lowest portion of first paper-contacting roller 14a. On the other hand, when the copier is set to the read mode, rollers 18a and 18b, are located such that their lowest portions are slightly below the level at which the lowest portion of first paper-contacting roller 14a is positioned. Auxiliary roller unit 18 is located at the same position as in the read mode, when sliding member 6a of switch 6 is moved to the OFF-position. Furthermore, when member 6a is moved to the E-position (i.e., the cassette-eject position), cam pins 22 can slip into vertical sections 21d of cam slits 21, and auxiliary roller unit 18 can, thus, be further lowered from the lower end of housing 1, by moving housing 1 upwardly.

As has been described, chassis block C is incorporated within housing 1 composed of front case block A and rear case block B. As is illustrated in FIG. 3, chassis block C comprises chassis 23 which extends vertically, along the sides of both case blocks A and B. Chassis block C further comprises second paper-contacting roller 14b, main encoder unit 24, print head unit 30, ribbon take-up unit 39, read unit 54, and power-supply unit (not shown) all attached to chassis 23.

Second paper-contacting roller 14b is rotatably secured to the lower end of one side of chassis 23. Roller 14b, which makes a pair with first paper-contacting roller 14a, is located at the same level as roller 14a. Housing 1 can be swept across an original or a sheet of printing paper, with two paper-contacting rollers 14a and 14b and two auxiliary paper-contacting rollers 18a and 18b kept in contact with, and rotating on the original or the printing paper.

Main encoder unit 24 is attached to the outer surface of that side of chassis 23 on which second paper-contacting roller 14b is rotatably mounted. This unit 24 is designed to detect, from the rotation of roller 14a, the distance the housing 1 has been moved across the original or the printing paper. Main encoder unit 24 comprises pin 25 horizontally projecting from the side of chassis 23, disk 26 rotatably mounted on pin 25, and rotation detector 27 fixed to the side of chassis 23 for detecting the angle through which disk 26 has rotated. As is evident from FIG. 3, disk 26 has a number of slits 26a extending in the radial direction and regularly spaced apart in the circumferential direction. Rotation detector 27 has a U-shaped cross section, and is positioned such that disk 26 is partly interposed between the legs of detector 27. A light-emitting element (not shown) such as a light-emitting diode is attached to the first leg of detector 27, and a light-receiving element (not shown, either) such as a photo-transistor is fastened to the second leg of detector 27, for receiving the light-emitted from the light-emitting element and passing through any one of radial slits 26a of disk 26. A pulley (not shown) is coaxially attached to disk 26, and a pulley (not shown) is coaxially connected to second paper-contacting roller 14b. Endless belt 28 is wrapped around these pulleys. Therefore, when roller 14a rotates, disk 27 is rotated, driven by belt 28. As disk 26 is thus rotated, radial slits 26a sequentially come into alignment with the light beam emitted from the light-emitting element. The light beam passing through any slit 26a is applied to the light-emitting element. Every time it receives light, the light-receiving element generates an electrical pulse. Hence, the more the disk 26 is rotated, the more pulses the light-receiving element generates.

As a result, the number of the pulses produced by the light-receiving element represents the angle through which roller 14b has rotated, or the distance for which housing 1 has been swept across the original or the printing paper.

Print head unit 30 is secure to the inner surface of the lower portion of chassis 23. Print head unit 30 comprises head-supporting frame 31 fastened to the lower portion of chassis 23, thermal print head 32 supported by frame 31, and a pair of springs 33 pushing head 32 downward. Head-supporting frame 31 consists of a back late (not shown) vertically extending at the back of print head 32, upper plate 31a horizontally extending from the upper edge of the back plate, and side plate 31b vertically extending. The back plate and upper plate 31a are fastened, at one end to chassis 23. Side plate 31b is connected to the other ends of the back plate and upper plate 31a. Springs 33, both biasing head 32 downward, are coil springs having the same force. They are interposed between the upper surface of head 32 and the upper plate 31a of head-supporting frame 31. A head-inclination adjust screw (not shown) is fastened to the back plate. Rear case 1b has through hole 38, thereby exposing the head-inclination adjust screw. Hole 38 is large enough to allow the passage of the shaft of a screw driver. Hence, the screw can be turned to adjust the inclination of head 32, by means of a screw driver. The inclination adjustment is carried out, with ribbon cassette 70 removed from housing 1.

Ribbon cassette 70 is inserted in housing 1. Cassette 70 contains take-up spool 73, ribbon-feeding spool 74, and a roll of ribbon 81. Take-up spool 73 is automatically coupled to ribbon take-up unit 39 when cassette 70 is set at a prescribed position within housing 1. Ribbon take-up unit 39 comprises ribbon take-up shaft 40 for rotating take-up spool 73, and electric motor 41 for driving ribbon take-up shaft 40. Shaft 40 is fitted into the axial hole of take-up spool 73 when cassette 70 is set at said prescribed position. Shaft 40 is rotatably supported, at one end, by chassis 23, and extends in the horizontal direction. Motor 41 is placed in motor housing 42 located above ribbon take-up shaft. Shaft 41a of motor 41 projects out of chassis 23 through a hole (not shown) made in the side of chassis 23. Driver gear 43 is connected to the tip of motor shaft 41a. Gear 43 meshes with first idler gear 44 meshes with second idler gear 45 which is also rotatably attached to chassis 23. Second idler gear 45 meshes with driven gear 46 fastened to the end of ribbon take-up shaft 40.

Print head unit 30 further comprises motor encoder unit 47. Motor encoder unit 47 is designed to detect the ribbon take-up speed, i.e., the speed of rotation of take-up shaft 40, from the speed of rotation of electric motor 41. Unit 47 includes disk 48 fastened to motor shaft 41a and having one radial slit 48a, and rotation detector 49 secured to chassis 23. Like detector 27, rotation detector 49 has a U-shaped cross section, and is located such that disk 48 is partly interposed between the legs of detector 49. A light-emitting element (not shown) and a light-receiving element (not shown, either) are attached to the legs, respectively, and optically aligned with each other. Thus, every time the radial slit 48a of disk 48 comes into alignment with the light beam emitted from the light-emitting element, that is, every time disk 48 rotates 360°, the light-receiving element receives the light beam and generates one electrical pulse.

Ribbon-feeding shaft 50 horizontally extends and, thus parallel to ribbon take-up shaft 40, and is located below shaft 40. Shaft 50 is a hollow one and has ridges extending parallel along the axis of shaft 50 and regular spaced apart in the circumferential direction thereof. One end portion of shaft 50 is inserted in a hollow cylinder (not shown) fixed to chassis 23, and can rotate about its axis and move along its axis. The other end portion of shaft 50 is automatically inserted into the hole made in take-up spool 74 of ribbon cassette 70 when cassette 70 is set in the prescribed position within housing 1.

Read unit 54 for reading image data from the original is also attached to chassis 23. Read unit 54 comprises base 55 which is fastened, at one end, to chassis 23 and located in front of motor housing 42, reading-circuit board 56 coupled to base 55, and linear sensor 57 attached to the lower surface of board 56. Linear sensor 57 is an image sensor such as a CCD (charge-coupled device). Linear sensor 57 has an array of photosensing elements, which extends at right angles to the direction in which housing 1 is swept across the original. In other words, the array of photosensing elements extends in the lengthwise direction of circuit board 56.

Read unit 54 further includes lens tube 59 protruding downward from base 55. Tube 59 contains focusing lens 60 which focuses the light reflected from the original illuminated by LED array 16, onto the light-receiving surface of linear sensor 57. Circuit board 56 is supported by board-supporting member 55a projecting upwardly from base 55, and can slide upon this member 55a in its width direction (i.e., the direction at right angles to the array of photosensing elements of sensor 57. If necessary, circuit board 56 is moved to bring the array into alignment with the optical axis of focusing lens 60.

Battery housing 66 is attached to the upper end portion of chassis 23, for accommodating a battery used as a power source.

The manually sweeping copier, which has been described, is assembled in the following way. First, chassis block C is positioned in rear case 1b, such that second paper-contacting roller 14b is located at the same level as first paper-contacting roller 14a coupled to front case 1a. Then, the chassis 23 is fastened to rear case 1b, thus connecting chassis block C to rear case block B. Further, front case block A is connected to rear case block B by fitting front case 1a to rear case 1b.

Ribbon cassette 70 will now be described in detail. Cassette 70 comprises case 71 which is a rectangular box having an open lower end. Case 71 is short enough to be interposed between the bottom of housing 1 and motor housing 42, and is thin enough not to cover up the light-receiving surface of linear sensor 57. Vertical slit 72 is cut in one side of case 71. This slit 72 is sufficiently long and wide to allow print head unit 30 to enter case 71 when ribbon cassette 70 is placed at the prescribed position within housing 1. Take-up spool 73 and ribbon-feeding spool 74 are incorporated in case 72. These spools 73 and 74 extend in the horizontal direction, and parallel to each other, as can be understood from FIG. 3. They are hollow shafts, each having axial grooves cut in the inner periphery. When cassette 70 is set at the prescribed position, the ridges of ribbon take-up shaft 40 are shaft 50 are inserted into the grooves of spool 74. A pair of ribbon-guiding bars 79a and 79b horizontally extend in the lower portion of case 71. Ribbon 81 fed from the role mounted on ribbon-feeding spool 74 is wrapped around, and guided by, these ribbon-guiding bars 79a and 79b, such that ribbon 81 is exposed at the open lower end of case 71.

As is shown in FIG. 3, cassette slot 1c is cut in one side of housing 1, more precisely, in the sides of front case 1a and rear case 1b. Cover 1d is movable attached to front case 1a by means of hinge 68, to close cassette slot 1c. Hooks 68a and 68b are fixed to the inner surface of cover 1d. Both hooks 68a and 68b are coupled to a lock member (not shown) which is mounted on the outer surface of cover 1d and can slide up and down. When the lock member is moved downward, hooks 68a and 68b engage with two projections 69a protruding from the inner surface of rear case 1b, provided that cover 1d is in the closed position. As a result, cover 1d is locked. When the lock member is moved upward, hooks 68a and and 68b disengage from projections 69a, whereby cover 1d is released.

Cover 1d is opened, and then ribbon cassette 70 is loaded into, or ejected from, housing 1 through cassette slot 1c. To load cassette 70 into housing 1, cassette 70 is positioned such that vertical slit 72 is aligned with print head unit 30, and the projecting end portions of spools 73 and 74 are set coaxially with ribbon take-up shaft 40 and ribbon-feeding shaft 50. Ribbon cassette 70, thus positioned, is inserted into housing 1 via slot 1c. As cassette 70 is gradually inserted, print head unit 30 enters case 71 through vertical slit 72 until print head 32 is arranged above the exposed portion of ribbon 81. At the same time, ribbon take-up shaft 40 and ribbon-feeding shaft 50 are fitted into take-up spool 73 and ribbon-feeding spool 74, respectively. After cassette 70 has been set at the prescribed position within housing 1, cover 1d is closed and locked, thereby holding cassette 70 in said position. Before loading ribbon cassette 70 into housing 1, the sliding member 6a of mode-selecting switch 6 is moved to the E-position, causing auxiliary roller unit 18 to move downwardly. Once unit 18 has been moved down, auxiliary paper-contacting roller 18a, which is located near cassette slot 1c, does not hinder the loading of ribbon cassette 70. Also, to eject cassette 70 out of housing 1 via slot 1c, sliding member 6a is moved to the E-position, whereby unit 18 is moved down to ensure an easy, smooth ejection of ribbon cassette 70. (Auxiliary roller unit 18 can move down when sliding member 6a is at the E-position, since both cam pins 22, which are fastened to member 6a, are located at the lower ends of vertical sections 21d of cam slits 21.)

Figure 4:
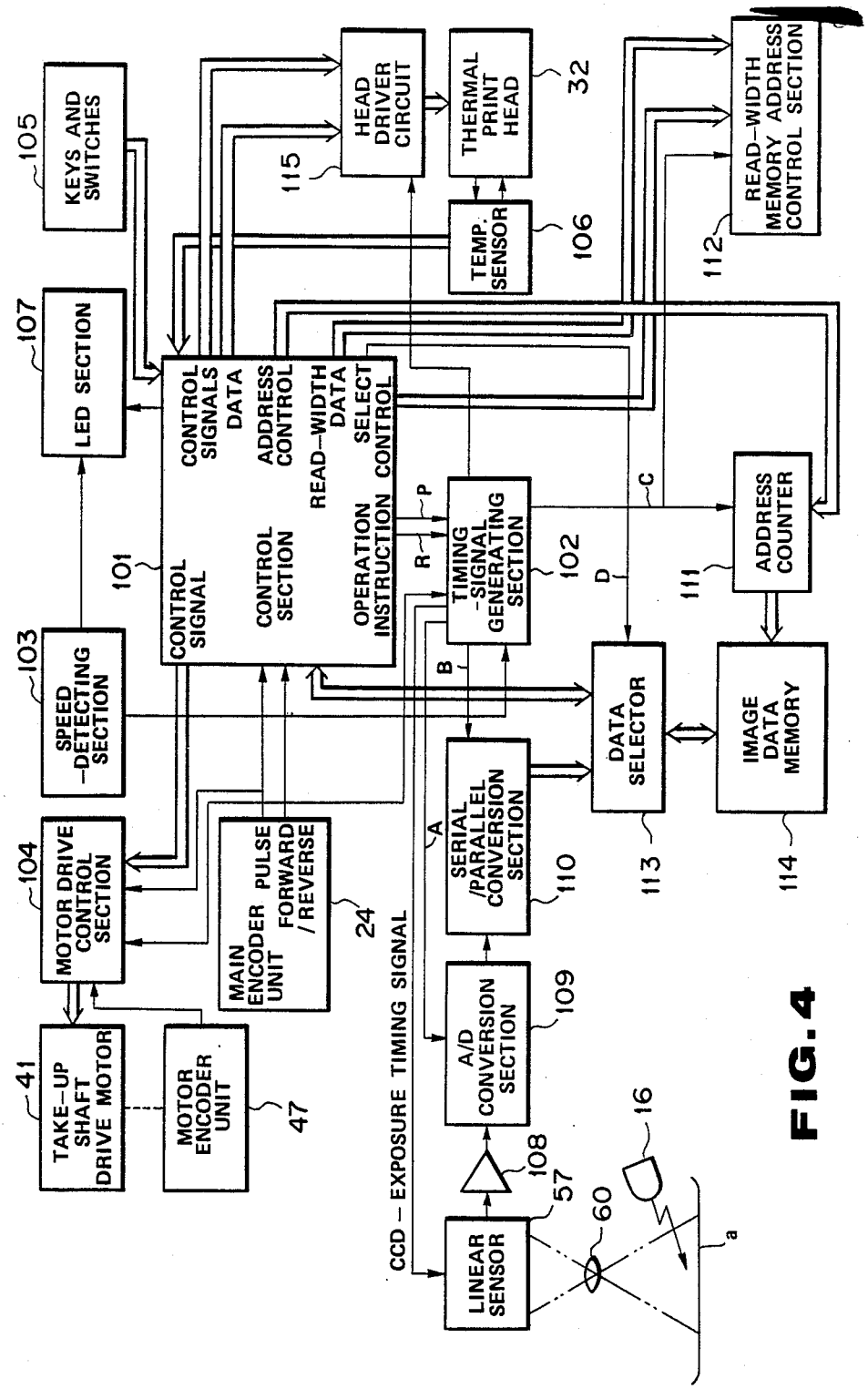
FIG. 4 is a block diagram showing the components of the copier, some incorporated within a housing, and the others provided on the housing.

The electronic circuit, the main component of which is circuit board 12a (FIG. 3), will now be described, with reference to FIG. 4. Main encoder unit 24, which comprises disk 26 and rotation detector 27, generates a pulse signal which represents the distance the housing 1 has been moved. It also generates a forward/reverse signal representing the direction in which disk 26 is rotating. The pulse signal is supplied to control section 101, timing-signal generating section 102 speed-detecting section 103, and motor drive control section 104. The forward/reverse signal is supplied to control section 101, timing-signal generating section 102, and motor drive control section 104. The signals output from keys and switches 105, such as start switch 2, enlarge-print key 3, reset/clear key 4, reading-width switch 5, mode-selecting switch 6 and print-density dial 8, are input to control section 101. Further, the temperature signal, which has been output by temperature sensor 106 and represents the temperatures of print head 32 and printing paper b, is supplied to control section 101. Control section 101 includes a power-supply voltage detector (not shown). In accordance with the signals output from keys and switches 105, control section 101 produces control signals for controlling power-on indicating LED 7a, speed alarm LED 7c, and some other components. Further, section 101 outputs operation command R when mode-selecting switch 6 has been operated to select the read mode, and operation command P when switch 6 has been operated to select the print mode. The operation command is supplied from control section 101 to timing-signal generating section 102.

When the operation command R is given from control section 101 to timing-signal generating section 102, section 102 outputs a CCD-exposure timing signal of a predetermined frequency, and also produces other timing signals, each having a prescribed frequency, such as a read-timing signal A, a serial/parallel conversion signal B and a clock pulse signal C, in synchronism with the pulse signal supplied from main encoder unit 24 and representing the distance the copier has been moved. On the other hand, when the operation command P is given from control section 101 to timing-signal generating section 102, section 102 generates a print-timing signal in synchronism with the pulse signal output by main encoder unit 24, provided that unit 24 also supplies the forward signal to timing-signal generating section 102.

The CCD-exposure timing signal, which has been output by timing-signal generating section 102, is input to linear sensor 57. Read-timing signal A, also output by section 102, is supplied to A/D conversion section 109. The serial/parallel conversion signal B, also output by section 102, is supplied to serial/parallel conversion section 110. The clock pulse signal C, which has been produced by section 102, is supplied to address counter 111 and read-width memory address control section 112.

Linear sensor 57 converts the light reflected from the original a into an electric signal in synchronism with the CCD-exposure timing signal. This electric signal is input to A/D conversion section 109. Section 109 converts the signal into a binary signal (black and white) in synchronism with read-timing signal A. The binary signal is supplied to serial/parallel conversion section 110. This section 110 converts the binary signal into, for example, 8-bit parallel signals in synchronism with the serial/parallel conversion signal B. The 8-bit parallel signals are input to image data memory 14 through data selector 113. Data selector 113 is connected to control section 101 by means of a data line. In accordance with a select signal D supplied from control section 101, data selector 113 is coupled to either control section 101 or serial/parallel conversion section 110.

Any write address (i.e., a combination of a row address and a column address) of image data memory 114 is designated by address counter 111 under the control of read-width memory address control section 112. More specifically, control section 101 supplies memory address control section 112 with the read-width data which has been provided by operating reading-width switch 6. Address counter 111 counts clock pulses C to the value corresponding to the read-width data. In other words, control section 101 causes image data memory 114 to store image data printed in a rectangular region whose width is proportionate to the distance between the point 0 on the scale (FIG. 1) extending along reading-width switch 6, on the one hand, and the position of sliding member 5a.

Any read address of image data memory 114 is designated by address counter 111 under the control of control section 101. More precisely, the read addresses, at which one row of characters is stored, are designated by address counter 111 in accordance with the read-width data supplied to read-width memory address control section 112.

Main encoder 24 does not supply timing-signal generating section 102 with pulses the number of which represents the distance $l_1$ between the line r (FIG. 8A), i.e., the initial position of linear sensor 57, and the front surface of housing 1 located at the data-reading start position. Timing-signal generating section 102 therefore supplies no clock pulses to address counter 111. Hence, that portion of the image data which is recorded in the region extending over this distance is no written into image data memory 114. Upon completion of reading the image data, that portion of the data, which is recorded in the region extending over distance $l_2$ (FIG. 8A) between the rear surface of housing 1 located at the data-reading end position and the final position of linear sensor 57, is erased from image data memory 114. As a result, memory stores only that portion of the image data which is recorded in the region extending from the front surface of housing 1 located at the data-reading start position and the rear surface of housing 1 located at the data-reading end position.

When the copier is set to the print mode after reading the image data, control section 101 outputs the operation command P to timing-signal generating section 102. Simultaneously, section 101 causes data selector 113 to read out the image data from memory 114, in accordance with the pulse signal supplied from main encoder unit 24. Control section 101 also calculates, from the output data items of temperature sensor 106, the power-supply voltage detector and print-density dial 8, an appropriate period during which to supply power to thermal elements of thermal print head 32. The data representing this period is supplied as print data to head drive circuit 115. In accordance with the print data, circuit 115 drives print head 32 in synchronism with the timing signal supplied from timing-signal generating section 102.

In the meantime, motor drive control section 104 supplies a motor-driving pulse signal to electric motor 41 in accordance with the pulse signal output by main encoder unit 24. Hence, motor 41 rotates ribbon take-up shaft 40 and, subsequently, take-up spool 73 of ribbon cassette 70. As a result, ribbon 81 is fed from the roll mounted on ribbon-feeding spool 74 and taken out around take-up spool 73, while kept in contact with thermal print head 32. Motor encoder unit 47 detects the rotation of motor 41, and generates a signal representative of the speed of motor 41. This signal is input to motor drive control section 104. In accordance with the signal, section 104 controls the torque of motor 41 such that ribbon 81 is taken up at a speed substantially equal to the speed of housing 1 being swept across a sheet of printing paper. As long as main encoder unit 24 supplies the reverse signal to motor drive control section 104, section 104 supplies no motor-driving pulses to electric motor 41. Therefore, ribbon 81 is neither fed from the roll nor taken up around take-up spool 73.

Figure 5:
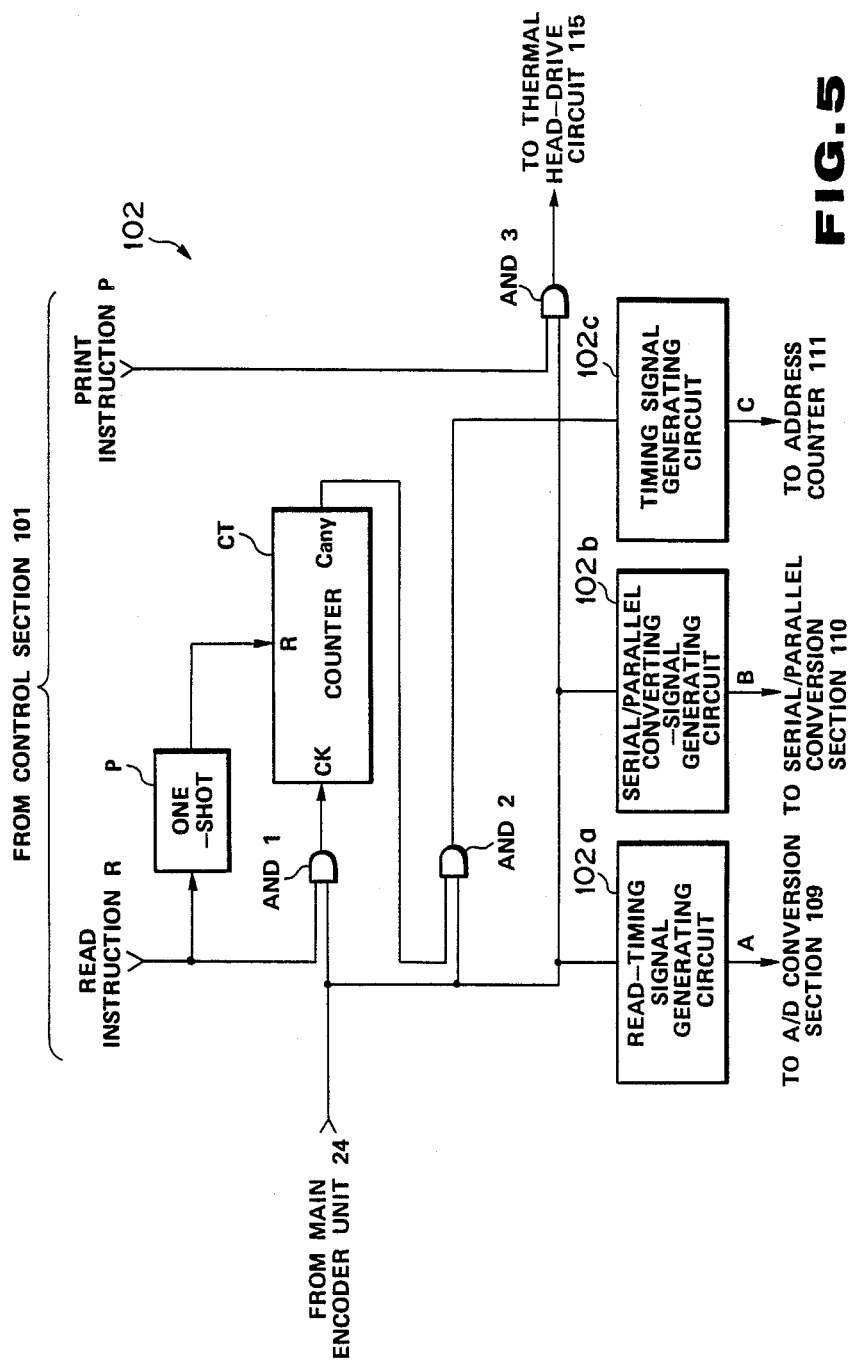
FIG. 5 is a circuit diagram illustrating the timing-signal generating section shown in FIG. 4.

FIG. 5 illustrates timing-signal generating section 102. When the operation command R is supplied from control section 101 to section 102, counter CT starts counting the pulses output by main encoder unit 24. In synchronism with the pulse signal output by main encoder unit 24, read-timing signal generating circuit 102a produces and supplies the read-timing signal A to A/D conversion section 109, and serial/parallel signal generating circuit 102b generates and supplies the serial/parallel conversion signal B to serial/parallel conversion section 110. Counter CT outputs a counter carry upon counting the number of pulses which corresponds to a distance $l_1$ (FIG. 8A) between a data-read start position r (FIG. 8A) and a forward data-read position. The counter carry is input to address counter timing-signal generating circuit 102c. In response to the counter carry, circuit 102c produces and supplies a clock pulse to address counter 111. In other words, timing-signal generating circuit 102c starts generating the clock pulse signal C when housing 1 is moved the distance $l_1$ across the original a.

When the operation command P is supplied from control section 101 to timing-signal generating section 102, section 102 starts producing a print-timing signal in synchronism with the pulse signal output by main encoder unit 24. This print-timing signal is supplied to head drive circuit 115.

Figure 6A:
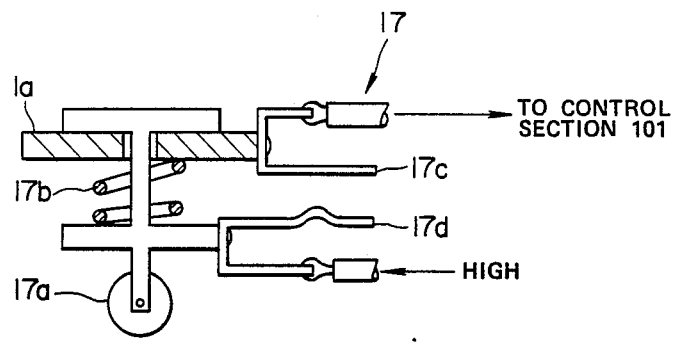
FIGS. 6A and 6B show, in detail, the touch-detecting switch used in the copier shown in FIG. 1.
Figure 6B:
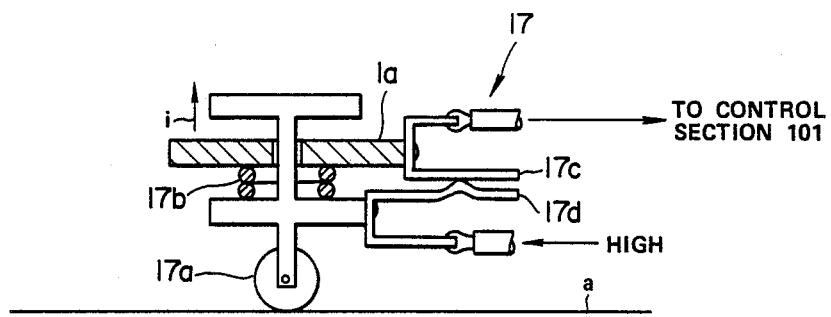

FIGS. 6A and 6B show touch-detecting switch 17 (FIG. 3). As is illustrated in these figures, switch 17 comprises operation pin 17a, coil spring 17b, and two contacts 17c and 17d. A small paper-contacting roller is rotatably attached to the lower end of operation pin 17a. When housing 1 is not placed on the original a or the printing paper b, spring 17b pushes pin 17a out of the lower end of housing 1, and contacts 17a and 17d are set apart as is shown in FIG. 6A. When housing 1 is placed on the original a or the printing paper b, pin 17a is pushed in the direction of arrow i as is shown in FIG. 6B, against the force of coil spring 17b, whereby contacts 17c and 17d come into mutual contact. Thus, touch-detecting switch 17 outputs a signal at a high level to control section 101 whenever housing 1 is put upon either the original a or the printing paper b.

Figure 7:
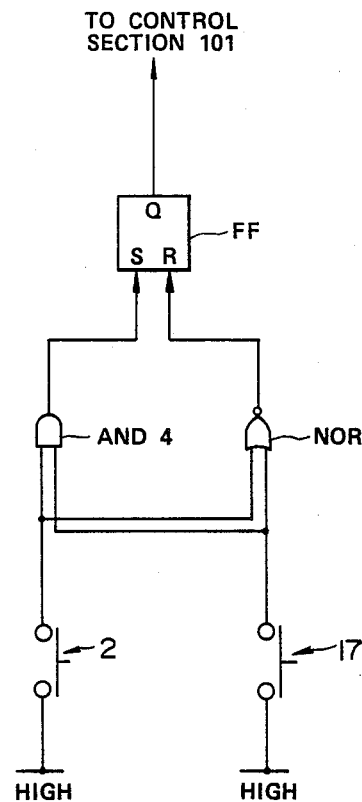
FIG. 7 is a circuit diagram showing a circuit for processing the signal output by the start switch shown in FIG. 1, and the signal output by the touch-detecting switch.

FIG. 7 is a circuit for processing the signal output by start switch 2 (FIG. 1) and the signal output by touch-detecting switch 17 (FIG. 3). This signal-processing circuit comprises an AND gate, a NOR gate, and a flip-flop FF. The output signal of start switch is supplied to the first input terminal of the AND gate, and also to the first input terminal of the NOR gate. The output signal of touch-detecting switch 17 is supplied to the second input terminal of the AND gate, and also to the second input terminal of the NOR gate. The output of the AND gate is supplied to the set terminal S of the flip-flop FF, whereas the output of the NOR gate is supplied to the reset terminal R of the flip-flop FF. The Q output of the flip-flop FF is supplied as a start command signal to control section 101. That is, the start command signal is input to section 101 when both start switch 2 and touch-detecting switch 17 are turned on, and the supply of this command signal to section 101 is stopped when both switches 2 and 17 are turned off. Therefore, the hand-held copier can reliably read image data from the original a and print the image data on the printing paper b, in accordance with the operator's operation of mode-selecting switch 6 and the contact between housing 1 and the original a or the paper b.

Figure 8A:
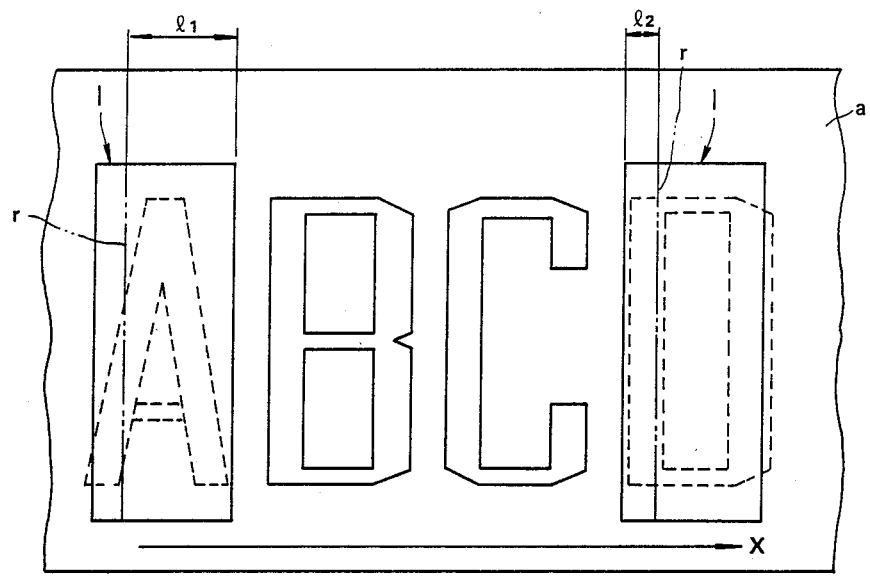
FIG. 8A is a diagram explaining how the copier reads image data from an original.

The operation of the hand-held copier will now be explained. To read the image data, such as characters and an image, from the original a, the operator moves mode-selecting switch 6 from the OFF-position (FIG. 1) to the R-position (FIG. 1). Then, the power-supply switch is automatically turned on, and control section 101 is automatically set to the read mode. Control section 101 turns on power-on indicating LED 7a, and gives the operation command R to timing-signal generating section 102. When sliding member 6a of switch 6 is moved to the R-position, cam pins (FIG. 3) are moved to the sections 21b of cam slits. As a result, auxiliary roller unit 18 moves down, whereby auxiliary paper-contacting rollers 18a and 18b protrude downward, to the positions below first and second paper-contacting rollers 14a and 14b. In this condition, the operator turns on start switch 2, and places housing 1 upon the original a, thus setting rollers 14a, 14b, 18a, and 18b into contact with the original a. If the operator wishes to read only letters "B" and "C" of the image data "ABCD" (FIG. 8A) printed on the original a, he or she aligns the front surface of housing 1 with the left side of that region of the original a in which letters "B" and "C" are printed, as is illustrated in FIG. 8A. Since touch-detecting switch 17 contacts the original a, and start switch 2 has already been turned on, the flip-flop FF inputs the start command signal to control section 101. In response to this start command signal, section 101 turns on LED array 16.

Then, the operator sweeps the copier, with housing 1 kept in contact with the original a, in the direction of arrow X shown in FIG. 8A. The light emitted from LED array 16 illuminates the original a. The light reflected from the original a is focused by focusing lens 60 and applied onto linear sensor 57. Meanwhile, second paper-contacting roller 14b is rotated as housing 1 is moved forward. As this roller 14b rotates, the disk 26 of main encoder unit 24 is rotated. Rotation detector 27, therefore, produces a pulse signal representing the distance housing 1 has been swept across the original a. This pulse signal, which is the output signal of main encoder unit 24, is supplied to control section 101, timing-generating section 102, speed-detecting section 103, and motor drive control section 104. Since housing 1 is being moved forward, that is, in the direction of arrow X (FIG. 8A), main encoder unit 24 also outputs a forward signal to control section 101, timing-signal generating section 102, and motor drive control section 104.

Upon receipt of the operation command R from control section 101, timing-signal generating section 02 generates the CCD-exposure timing signal and supplies this signal to linear sensor 57. Also, timing-signal generating section 102 produces the read-timing signal A and the serial/parallel conversion signal B in response to the pulse signal output by main encoder unit 24 and supplies signals A and B to A/D conversion section 109 and serial/parallel conversion section 110, respectively. Further, timing-signal generating section 02 outputs the clock pulse signal C after the counter CT counts the number of pulses output by unit 24, which corresponds to the distance 1 shown in FIG. 8A.

In synchronism with the CCD-exposure timing signal supplied from timing-signal generating section 102, linear sensor 57 generates image signals from the light which has been reflected from the original a. The image signals are amplified by amplifier 108 and subsequently input to A/D conversion section 109. A/D conversion section 109 converts the amplified image signals into a serial digital signal, in synchronism with the read-timing signal A output by timing-signal generating section 102. The serial digital signal is input to serial/parallel conversion section 110. Section 110 converts the serial digital signal into 8-bit parallel signals, in synchronism with the serial/parallel conversion signal B supplied from timing-signal generating section 102. These 8-bit parallel signals are input to data selector 113. Since mode-selecting switch 6 has been operated, thus selecting the read mode, data selector 113 selects the data output by serial/parallel conversion section 110, in response to the select signal D supplied from control section 101. Hence, the image data output by section 110, i.e., the 8-bit parallel signals, is supplied via data selector 113 to image data memory 114.

Any write address of image data memory 114 is designated by the count value of address counter 111. Address counter 111 increments the column address by one in response to one clock pulse C supplied from timing-signal generating section 102, thereby updating the write address of image data memory 114. Every time one line of image data is written into memory 114, timing-signal generating section 102 stops generating the timing signals A and B. Section 102 outputs no timing signals until it receives the next pulse signal from main encoder unit 24.

Reading-width switch 6 has been operated, thus setting a desired reading-width. The data representing the number of addresses, which corresponds to the desired reading-width, has been set to read-width memory address control section 112. Address counter 111 designates those write addresses of memory 114 the number of which is represented by the data set to section 112. Thus, the image data printed in the region whose width is equal to the distance between the point 0 on the scale (FIG. 1) and the position of the sliding member 5a of reading-width switch 5 is written into image data memory 114.

No clock pulses C are input to address counter 111 until housing 1 is moved the distance 1. The image data, which has been read by linear sensor 57 while no clock pulses C are being supplied to counter 111, is not written into image data memory 114.

Other one-line data items are read from the original a, one after another, and subsequently written into image data memory 114, as the operator further sweeps housing 1 across the original a in the direction of arrow X (FIG. 8A).

When the front surface of housing 1 comes into alignment with the right side of the region in which letters "B" and "C" are printed, the operator turns off start switch 2 and then moves up housing 1 from the original a, thus turning off touch-detecting switch 17. Then, the flip-flop FF (FIG. 7) is reset. Hence, the reading of letters "B" and "C" is completed.

Figure 9:
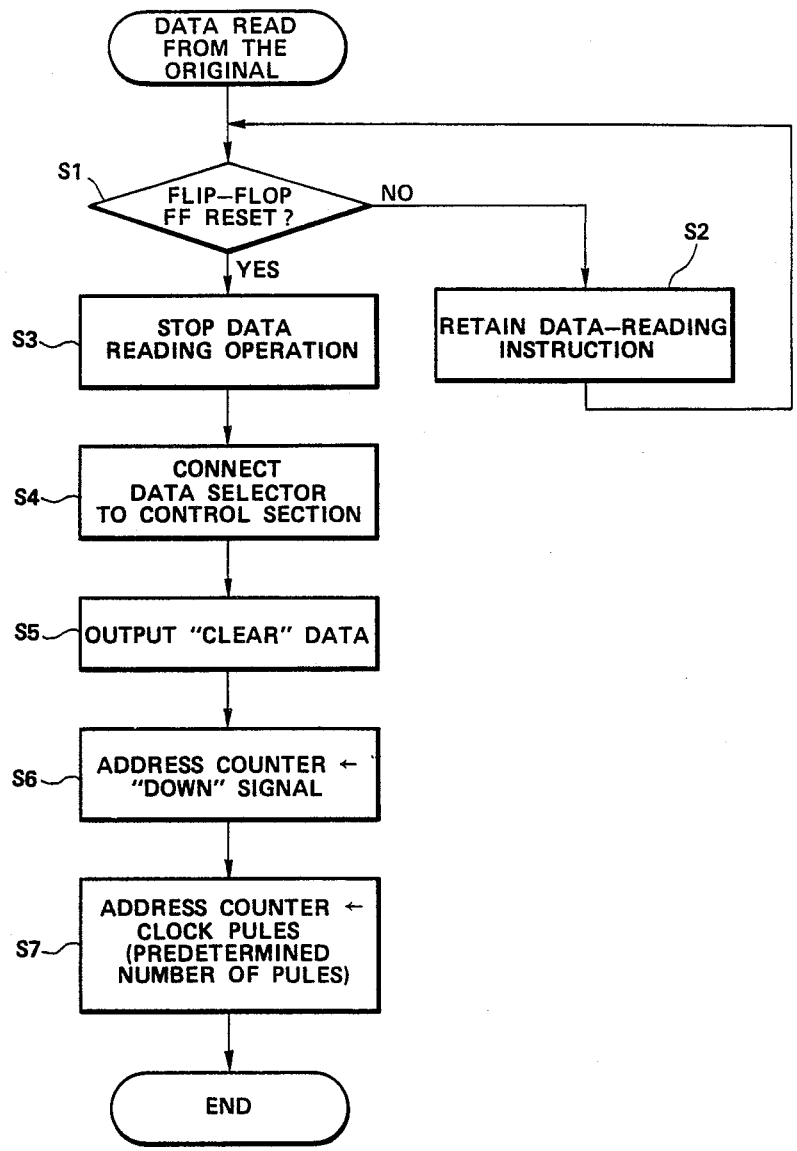
FIG. 9 is a flow chart explaining how the copier shown in FIG. 1 reads image data from an original.

With reference to the flow chart of FIG. 9, it will be explained how the data-reading operation is terminated. First, in step S1, it is determined whether or not the flip-flop FF has been reset. If NO, control section 101 continues to output the operation command R, in step S2. Then, the operation returns to step S1. Hence, as long as the flip-flop FF is set, section 101 keeps on outputting the operation command R. And, even if one of switches 2 and 17 turns off, flip-flop FF is not turned off. Therefore, even if the operator mistakenly turns off start switch 2 while housing 1 being swept across the original a to read the image data therefrom, or even if touch-detecting switch 17 is turned off due to an erroneous upward movement of housing 1, the flip-flop FF is not reset and steps S1 and S2 are repeated. Thus, the data reading operation is continued.

When the operator turns off start switch 2 to stop the data-reading operation, and then moves up housing 1 from the original a, thus automatically turning off touch-detecting switch 17, the flip-flop FF is reset. In this case, it is determined in step S1 that the flip-flop FF has been reset. As a result, in step S3, control section 101 stops generating the operation command R. In the next step, S4, data selector 113 is disconnected from serial/parallel conversion section 110, and is connected to control section 101. Then, in step S5, "clear" data is supplied from control section 101 to image data memory 114. In step S6, a "down" signal is supplied to address counter 111. Then, in step S7, a predetermined number of clock pulses C are input from timing-signal generating section 102 to address counter 111. The predetermined number of pulses C corresponds to the distance 2 between the data-read end position r and the rear surface of housing 1. Hence, address counter 111 decrements the write address by the value corresponding to the predetermined number of clock pulses C. As a result, the image data printed in a region over this distance 2 is erased from image data memory 114. That portion of the image data printed on the original a, which extends between the front surface of housing 1 at the print-start position and the rear surface of housing 1 at the print-end position, i.e., the desired portion of the image data, is reliably read the original a and written into image data memory 114.

When the sliding member 6a of mode-selecting switch 6 is moved to the R-position, both auxiliary paper-contacting rollers 18a and 18b protrude more from the lower end of housing 1 than first and second paper is slightly titled forward as it is swept across the original a during the data-reading operation. Thus, neither print head 32 nor ribbon 81 wrapped around head 32 contacts the original a while housing 1 is moved across the original a. Print head 32 is prevented from being worn, and ribbon 81 does not make the original a dirty.

Speed-detecting section 103 detects the speed of housing 1, from the pulse signal output by main encoder unit 24. When the speed of housing 1 rises above a reference value, section 103 outputs a signal. This signal turns on speed alarm LED 7c, thus informing the operator that he or she is moving the copier too fast. When the remaining memory capacity of image data memory 114 decreases to a predetermined value, control section 101 turns on memory alarm LED 7b, thereby informing the operator that memory 114 will soon overflow.

Now, it will be explained how the hand-held copier operates to print the image data which has been read from the original a. At first, the operator moves the sliding member 6a of mode-selecting switch 6 to the P-position (FIG. 1). Then, control section 101 is set to the print mode. Section 101 supplies the select signal D to data selector 113, thereby connecting data selector 113 to control section 101. As sliding member 6a is moved, cam pins 22 move to horizontal sections 21a of cam slits 21 through slanted sections 21c. As a result, movable plate 19 is pushed upwardly, and auxiliary roller unit 18, which is fastened to plate 19, is moved upward. The lowest portions of auxiliary paper-contacting rollers 18a and 18b are thus positioned at the same level as the lowest portions of first and second paper-contacting rollers 14a and 14b. The operator places the copier upon the printing paper b (e.g., a leaf of a notebook), with paper-contacting rollers 14a, 14b, 18a and 18b contacting the paper b. When the copier is thus placed, touch-detecting switch 17 is automatically turned on, and print head 32 presses ribbon 81 onto the printing paper b. Since print head 32 is urged downward by springs 33, it is held in contact with the printing paper b as long as paper-contacting rollers 14a, 14b, 18a, and 18b contact the paper b.

When the operator turns on start switch 2, control section 101 gives the operation command P to timing-signal generating section 102. Then, the operator sweeps housing 1 across the printing paper b in the forward direction. When the speed of housing 1 rises above the reference value, section 103 causes speed alarm LED 7c, thus informing this fact. As housing 1 is moved forward, all paper-contacting rollers rotate. Disk 26, which is connected to second paper-contacting roller 14a by means of endless belt 28, is therefore rotated. Hence, main encoder unit 24 produces a pulse signal which represents the distance the copier has been swept across the printing paper b. Further, unit 24 generates a forward signal. Both the pulse signal and the forward signal are input to motor drive control section 104.

In response to the pulse signal and the forward signal, motor drive control section 104 drives electric motor 41. Motor 41 in turn rotates ribbon take-up shaft 40, thereby rotating the take-up spool 37 in the ribbon take-up direction. As a result, ribbon 81 is fed from the roll mounted on ribbon-feeding spool 74 of ribbon cassette 70. Ribbon 81 passes by the heat-generating section of thermal print head 32 and is subsequently taken up around take-up spool 37.

Motor encoder unit 47 detects the rotation of electric motor 41 and supplies one pulse to motor drive control section 104 every time motor shaft 41a rotates 360°. Section 104 determines the speed of motor 41 from the frequency at which unit 47 outputs pulses. Section 104 adjusts the torque of motor 41 such that the speed of motor 41 becomes equal to the speed at which housing 1 is being swept across the printing paper b. More specifically, motor drive control section 104 compares the number of the pulses which unit 24 generates while motor shaft 41a rotates 360°, with a predetermined value. If this number of pulses is greater than the predetermined value, that is, if housing 1 is being moved faster than ribbon 81 is being taken up around take-up spool 37, section 104 increases the width of the pulses for driving electric motor 41, thereby raising the ribbon take-up speed. Conversely, if said number of pulses is less than the predetermined value, that is, if housing 1 is being swept more slowly than ribbon is being taken up, motor drive control section 104 decreases the width of the motor-driving pulses, thus reducing the ribbon take-up speed. The larger the diameter of the roll of used ribbon, which is mounted on take-up spool 73, the greater the load applied on electric motor 41 and, hence, the lower the ribbon takeup speed. Therefore, section 104 increases the width of the motor-driving pulses, in proportion to the load exerted on motor 41, and thus increases the torque of motor 41, to the same value as the speed at which housing 1 is being swept across the printing paper b.

Meanwhile, in accordance with the pulse signal supplied from main encoder unit 24, control section 101 gives a command to timing-signal generating section 102, in order to cause print head 32 to print one line of image data on printing paper b. Upon receipt of this command, section 102 supplies a print-timing signal to head drive circuit 115. Control section 101 supplies an address control signal to address counter 111, in accordance with the pulse signal output by main encoder unit 24. In response to the address control signal, address counter 111 designates the row addresses and column addresses of image data memory 114, one after another. Hence, the image data stored in memory 114 is supplied via data selector 113 to head drive circuit 115, one-line data item at a time.

After giving section 102 the command for printing one-line of image data, control section 101 calculates the period of time during which to supply power to print head 32, from the print density set by turning print-density dial 8, the temperature of head 32 detected by temperature sensor 106, the number of dots forming the image data which is to be printed, and the output signal of the power-supply voltage detector. Further, control section 101 supplies head drive circuit 115 with the image data read out from memory 114 via data selector 113. In accordance with the image data and the timing signal output by timing-signal generating section 102, head drive circuit 115 drives thermal print head 32. Head 32 prints the image data on the printing paper b, by thermally transferring the ink from ribbon 81 onto the paper b.

Figure 8B:
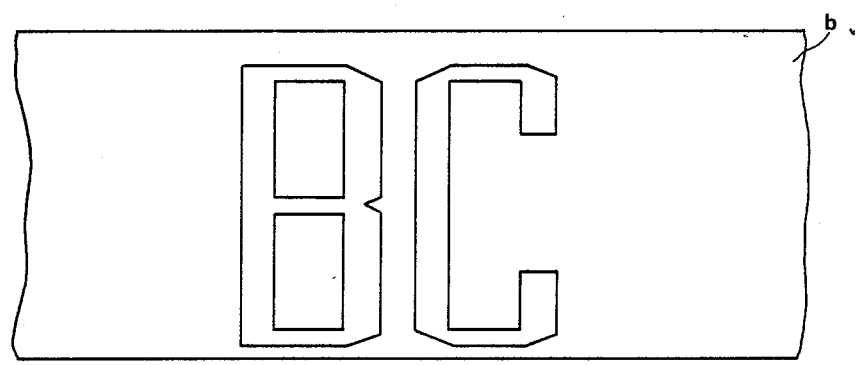
FIG. 8B shows the image data which has been read from the original shown in FIG. 8A and then printed on a printing medium, by means of the copier shown in FIG. 1.
Figure 8C:
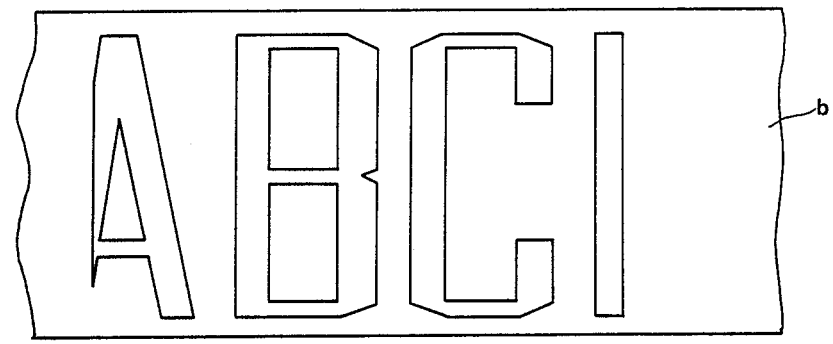
FIG. 8C shows the image data which has been read from the original shown in FIG. 8A and then printed on a printing medium, by means of a conventional manually sweeping copier.

As housing 1 is swept across the paper b, motor 41 rotates ribbon take-up shaft 40. Thus, take-up spool 73, which is coupled to shaft 40, is also rotated and takes up ribbon 81. The unused portion of ribbon 81 is, therefore, fed from the roll mounted on ribbon-feeding spool 74. The image data stored in memory 114 is printed, one line by one line, on the printing paper b. More precisely, the letters "B" and "C", which have been read from the original a, as is illustrated in FIG. 8A, are printed on the printing paper b, as is shown in FIG. 8B. Neither a part of the letter "A" nor a part of the letter "D" is printed as is shown in FIG. 8C. The copier according to the first embodiment of the present invention can read and print image data correctly.

The image printed on the paper b has the same width as the reading-width set by operating reading-width switch 5. Nonetheless, if enlarge-print key 3 has been depressed before the printing of the image data, the image printed on the paper b has a width which is greater than the one set by operating switch 5. Further, if reset/clear key 4 is depressed after the image data has been printed, the same image data can be printed again.

As has been described above, the hand-held copier, which is the first embodiment of the present invention, can read image data from an original, merely by sweeping housing 1 across the original, and can also print the image data on a sheet of printing paper, merely by sweeping housing 1 across the printing paper. In addition, since control section 101 outputs neither the read-command R nor the print-command P unless both start switch 2 and touch-detecting switch 17 are turned on, the data-reading operation or the data-printing operation will not be started if the lower end of housing 1 does not appropriately contact the original or the printing paper. Further, since the flip-flop FF is not reset even if start switch 2 or touch-detecting switch 17 is turned off during the data-reading or data-printing operation, section 101 continues to output the read-command R or the print-command P, and the data-reading or data-printing operation is not discontinued. In other words, even if the operator mistakenly turns off start switch 2 though he or she wishes to continue the data-reading or data-printing operation, the flipflop FF remains set, and the copier continues to read or print the image data even if touch-detecting switch 17 is turned off because the operator improperly moves housing 1 or because the original or the paper is warping.

Second Embodiment

A hand-held copier according to a second embodiment of the present invention will now be described. This copier is identical to the hand-held copier according to the first embodiment, except that a circuit which differs from the one shown in FIG. 7 is used to process the signal output by start switch 2 and the signal output by touch-detecting switch 17.

Figure 10:
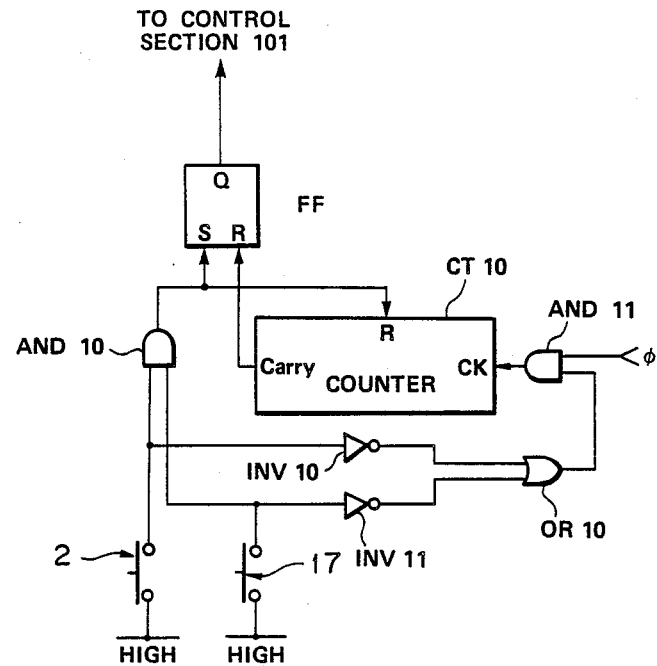
FIG. 10 is a circuit diagram illustrating a circuit which is used in a second embodiment of the invention, for processing the signal output by the start switch shown in FIG. 1, and the signal output by the touch-detecting signal.

As is shown in FIG. 10, the signal-processing circuit used in the second embodiment comprises AND gate 10, inverters INV10 and INV11, OR gate OR10, AND gate 11, counter CT10, and flip-flop FF. The signal output by start switch 2 is supplied to the first input terminal of AND gate 10, and also to the first input terminal of OR gate OR10 via inverter INV10. The signal output by touch-detecting switch 17 is supplied to the second input terminal of AND gate 10, and also to the second input terminal of OR gate OR10 through inverter INV11. The output signal of AND gate 10 is input to the set terminal S of flip-flop FF. The output signal of OR gate OR10 is supplied to the first input terminal of AND gate 11. Clock pulses $\phi$ are supplied to the second input terminal of AND gate 11. The output signal of AND gate 11 is input to the clock terminal CK of counter CT10. Counter CT10 generates a carry signal every time it counts clock pulses the number of which corresponds to a predetermined time (e.g., 5 seconds). The carry signal is input to the reset terminal R of flip-flop FF. The output signal of AND gate 10 is input to the reset terminal R of counter CT10. The Q output of flip-flop FF is supplied to control section 101 as an operation-start command.

Hence, the flip-flop FF outputs the operation-start command when both start switch 2 and touch-detecting switch 17 are turned on, and stops producing this command upon lapse of said predetermined time after either switch 2 or switch 17 has been turned off. That is, the operation-start command is not generated unless the operator turns on switch 2 and housing 1 is appropriately positioned with respect to the original a or the printing paper b. Moreover, even if switch 2 or switch 17, or both are turned off temporarily, but not over said predetermined time, control section 101 continues to output the operation command R or the operation command P. Hence, if switch 2 and/or switch 17 is turned on within the predetermined time after it has been turned off mistakenly or accidentally, the copier keeps on reading image data from the original, or printing image data on the printing paper.

What is claimed is:

1. A hand-held manually sweepable apparatus, comprising:

housing means arranged to be manually sweepable across an original that has image data thereon;

image-data processing means provided in said housing means, for reading the image data from the original while said housing means is swept manually across the original;

memory means provided in said housing means, for storing the image data read by said image-data processing means;

touch-detecting means associated with said housing means, for detecting whether or not said housing means contacts the original and for generating a detection signal when said housing means contacts the original;

manual switching means associated with said housing means, for generating an ON-signal when turned on, and an OFF-signal when turned off;

signal-condition detecting means provided in said housing means, for detecting the detection signal output from said touch-detecting means and the ON-signal and the OFF-signal output said manual switching means, and for generating a start signal when both of the detection signal and the ON-signal are output, and for generating a stop signal in response to at least one of the two conditions wherein (1) no detection signal is output from said touch-detection means, and (2) the OFF-signal is output from said manual switching means, after the start signal is generated;

distance-detecting means associated with said housing means, for detecting when said housing means has been swept across the original for a first predetermined distance from when the start signal is generated by said signal-condition detecting means;

memory control means provided in said housing means, for controlling a writing operation of said memory means so as to start the writing operation of said memory means when said distance-detecting means detects that said housing means has been swept across the original for the first predetermined distance; and invalidating means provided in said housing means, for invalidating a predetermined amount of image data last read from the original and stored in said memory means, when the stop signal is output from said signal-condition detecting means.

2. A hand-held manually sweepable apparatus according to claim 1, wherein said signal-condition detecting means includes means for generating the stop signal when said touch-detecting means stops generating the detection signal and said manual switching means generates the OFF-signal after the start signal is generated.

3. A hand-held manually sweepable apparatus according to claim 1, wherein said signal-condition detecting means includes means for generating the stop signal after the start signal is generated either when no detection signal is output from said touch-detecting means, or when the OFF-signal is output from said manual switching means.

4. A hand-held manually sweepable apparatus according to claim 3, wherein said signal-condition detecting means includes:

time-measuring means for measuring time either while said touch-detecting means does not generate the detection signal, or while said manual switching means is generating the OFF-signal; and stop-signal generating means for generating the stop signal when said time measuring means has measured a predetermined time.

5. A hand-held manually sweepable apparatus according to claim 1, wherein said housing means includes roller means capable of contacting the original and capable of rotating while said housing means is swept across the original; and said touch-detecting means includes means for detecting when said roller means contacts the original.

6. A hand-held manually sweepable apparatus according to claim 1, comprising:

position detecting means provided in said housing means, for detecting the relative position of said housing means while being swept across the original, and for producing position signals every time said housing means is swept over a second predetermined distance, said position signals representing the position of said housing means with respect to the original; and wherein said distance-detecting means includes counting means for counting the number of the position signals output from said position detecting means from when the start signal is generated by said signal-condition detecting means, for detecting when said housing means has been swept across the original for said first predetermined distance.

7. A hand-held manually sweepable apparatus according to claim 1, wherein said memory control means includes:

addressing means for addressing said memory means; and activating means for activating said addressing means when said distance-detecting means detects that said housing means has been swept across the original for said first predetermined distance.

8. A hand-held manually sweepable apparatus according to claim 1, wherein said housing means is substantially rectangular box shaped with at least one opening cut in one end thereof along its longitudinal direction, and said image-data processing means includes:

a light source provided near said opening for applying light to the original; and an image sensor for receiving the light reflected from the original and for converting the received light into electric signals having levels corresponding to the amount of the received light while said housing means is swept across the original.

9. A hand-held manually sweepable apparatus according to claim 8, wherein said distance detecting means includes means for detecting when said housing means has been swept across the original for a distance between a forward side surface of said housing means and said opening of said housing means.

10. A hand-held manually sweepable apparatus according to claim 8, wherein said invalidating means includes erasing means for erasing said predetermined amount of image data last read and stored in said memory means when the stop signal is output from said signal-condition detecting means.

11. A hand-held manually sweepable apparatus according to claim 10, wherein said erasing means includes means for erasing image data stored in said memory means which data has been read from the original while said housing means is swept across the original for a last distance between a backward side surface of said housing means and said opening of said housing means.

12. A hand-held manually sweepable apparatus according to claim 1, wherein said invalidating means includes erasing means for erasing said predetermined amount of image data last read and stored in said memory means when the stop signal is output from said signal-condition detecting means.

13. A hand-held manually sweepable apparatus according to claim 1, comprising:

printing means associated with said housing means, for printing the image data stored in said memory means while said housing means is swept manually across a printing medium; and printing control means provided in said housing means, for causing a printing operation of said printing means from when the start signal is generated by said signal-condition detecting means until the stop signal is generated by said signal-condition detecting means.

* * * * *

UNITED STATES PATENT AND TRADEMARK OFFICE
CERTIFICATE OF CORRECTION

PATENT NO. : 4,894,730

DATED : January 16, 1990

INVENTOR(S) : YANAGAWA et al

It is certified that error appears in the above-identified patent and that said Letters Patent is hereby corrected as shown below:

In the title page, the correct names of the first two inventors are:

--Mikio Yanagawa-- (not "Nikio Yanagawa")

--Kanji Honda-- (not "Kenji Honda")

Signed and Sealed this

Second Day of July, 1991

*Attest:*

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,894,730
DATED : January 16, 1990
INVENTOR(S) : YANAGAWA et al

It is certified that error appears in the above-identified patent and that said Letters Patent is hereby corrected as shown below:

On the title page, FOREIGN PATENT DOCUMENTS:

"61-28175" should read --61-281759--

"0245768" should read --62-0245768--

"0042273" should read --63-0042273--

"0086665" should read --63-0086665--

"0158962" should read --63-0158962--

Signed and Sealed this

Twenty-fourth Day of September, 1991

Attest:

HARRY F. MANBECK, JR.

*Attesting Officer*  *Commissioner of Patents and Trademarks*